March 8, 1938.  M. VOOGD  2,110,431
PROCESS FOR THE ABSORPTION OF NITROGEN OXIDES FROM GASES
Filed Aug. 3, 1934
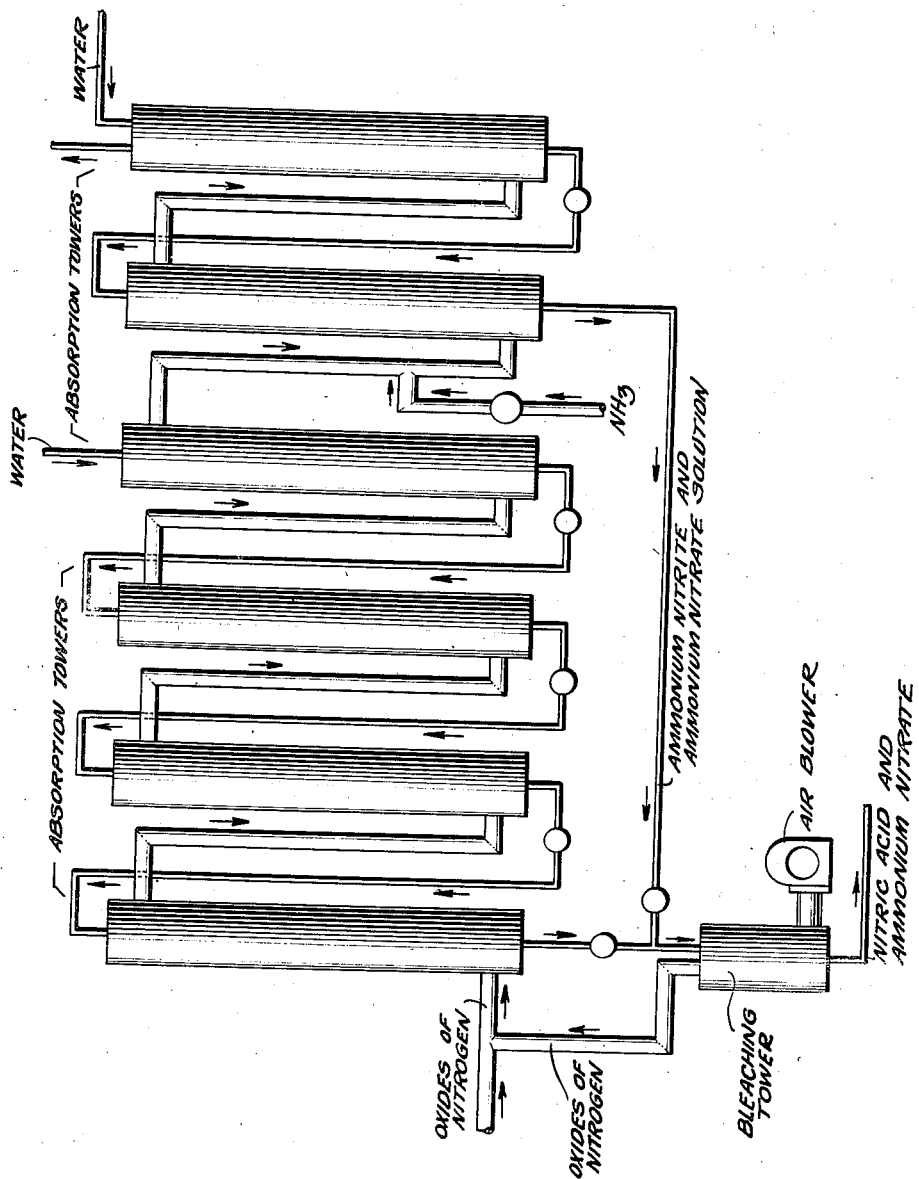
INVENTOR: MAARTEN VOOGD
BY HIS ATTORNEY:

Patented Mar. 8, 1938

2,110,431

UNITED STATES PATENT OFFICE 2,110,431

PROCESS FOR THE ABSORPTION OF NITROGEN OXIDES FROM GASES

Maarten Voogd, Beverwijk, Netherlands, assignor to Shell Development Company, San Francisco, Calif., a corporation of Delaware Application August 3, 1934, Serial No. 738,373
In the Netherlands August 11, 1933

4 Claims. (Cl. 23—103)

The invention relates to a process for the absorption of nitrogen oxides, from gases containing these oxides and, if desired, for manufacturing ammonia salts.

In general gases containing nitrogen oxides, particularly the gases leaving the acid absorption in the manufacture of nitric acid from oxidation products of ammonia, are to be taken into consideration as base material. The latter gases consist for the greater part of nitrogen and contain in addition a few percent of oxygen and a usually very small amount of nitrogen oxides.

In order to prevent the spreading of poisonous gases in the surroundings and further to convert the nitrogen oxides contained in the gases mentioned above into useful products, an alkaline absorption is usually carried out after the acid absorption. When the gases flow through this alkaline absorption, consisting of one or more absorption towers in which a soda solution of about 10% concentration circulates, the nitrogen oxides are bound in the form of a mixture of sodium nitrate and sodium nitrite. As soon as the soda has been converted practically entirely a fresh solution of soda is taken into use. The sodium nitrite and sodium nitrate is then treated with nitric acid, the nitrous acid set free blown out with steam and the remaining acid solution of sodium nitrate, after having been neutralized with soda, worked up to solid sodium nitrate.

A great drawback of this soda absorption is that it is very expensive, so that the sodium nitrate obtained is considerably dearer than the natural sodium nitrate, whilst the yield is only small.

It has now been found that a practically complete absorption of the nitrogen oxides can be achieved in a particularly advantageous manner whilst avoiding the expensive soda absorption and the small production of sodium nitrate by bringing the gases containing the nitrogen oxides whilst in the presence of water, water vapour, or an aqueous medium and of oxygen or a gas containing or yielding oxygen, into contact with $NH_3$. Preferably this $NH_3$ is previously added to the gas, but the gas may also be led into ammoniacal water. If so desired both measures may be applied.

When using aqueous solutions of ammonia for the absorption a certain loss of ammonia occurs owing to the high vapour tension of the solutions in question when the gases flow through the absorption towers in which the solution of ammonia circulates.

With the process according to the invention gaseous ammonia is preferably added to the gases in view of this loss, after which the gases containing ammonium nitrite in the form of mist are brought into contact with water or an aqueous medium. In this manner there is hardly any loss of ammonia.

It is recommendable to add a slight excess of $NH_3$ in proportion to the nitrogen oxides contained in the gases, so that the absorption liquid is just ammoniacal. Thus the corrosion of iron is prevented, whilst the solution of nitrite obtained becomes more stable.

The process according to the invention may, for instance, be carried out as follows:

A very slight excess of ammonia gas, calculated on the nitrous gases present, is admixed to the gas leaving the acid absorption in the manufacture of nitric acid from the oxidation products of ammonia and having the following composition: about 97.8% $N_2$, about 2% $O_2$ and about 0.2% nitrous gases. The ammonia gas reacts with the nitrogen oxides, the oxygen and the water vapour contained in the gas, whilst at the same time a mist of ammonium nitrate and ammonium nitrite is formed. Then the gases containing nitrate and nitrite are brought into contact with water or an aqueous salt solution, e. g. aqueous ammonium nitrate in one or more absorption towers. The mists formed dissolve in the water, whilst the nitrogen oxides which so far have not been converted react further to ammonium nitrite and nitrate. The rate of flow of the gas is adjusted so that the gas on leaving the absorption towers practically no longer contains any nitrogen oxides. The reaction takes place very rapidly, so that even when the time of contact is very short the residual gas contains only a few hundredths percent of nitrogen oxides.

The solution resulting from the absorption and containing principally ammonium nitrite in addition to more or less considerable quantities of ammonium nitrate may be circulated in the absorption towers until the concentration of the nitrite is sufficient, after which the solution may be removed from the system either continuously or intermittently and the nitrite may be converted into the corresponding ammonia salts in a known manner by treating it with strong acids, such as nitric acid, sulphuric acid, hydrochloric acid, etc. and blowing out the liberated nitrogen oxides with air, oxygen or air enriched with oxygen or some other gas. The nitrogen oxides hereby set free are returned to the acid absorption, whilst the solution of ammonia salt obtained, if circumstances permit, is worked up to solid salt.

If the nitric acid resulting from the acid absorption is to be used for manufacturing ammonium nitrate, it is of particular advantage to add the solution of ammonium nitrite resulting from the final absorption according to the invention to the nitric acid during or before the last manipulation of this acid, viz. blowing out with air (the so-called bleaching). This bleaching process is generally carried out in a small tower, the slightly preheated acid trickling down the filling material of the tower countercurrently to a stream of air or oxygen or other gases. Instead of a bleaching tower a bleaching vessel may be used. The solution of ammonium nitrite and nitrate, together with the freshly produced crude nitric acid is introduced into the bleaching tower or bleaching vessel. The liberated nitrogen oxides are then returned to the acid absorption whilst the nitric acid containing ammonium nitrate obtained is worked up to pure ammonium nitrate or mixtures containing ammonium nitrate, such as calcium nitrate containing ammonium nitrate, double salts of ammonium nitrate and sulphate, mixtures of ammonium nitrate with calcium carbonate and the like.

Both during the separate conversion of the ammonium nitrite solution with strong acids, such as nitric acid, sulphuric acid, hydrochloric acid, into the corresponding ammonium salts whilst removing the liberated nitrogen oxides as described above and during such conversion in combination with the last manipulation to be applied to crude nitric acid, to wit the blowing out with air (the so-called bleaching referred to in the preceding paragraph) it is recommended to carry out this blowing-out operation as quickly as possible, in order to avoid decomposition of ammonium nitrite into nitrogen and water, which decomposition readily occurs in an acid medium. A suitable manner to perform this consists in passing the oxygen or the air or mixtures of such gases in very small bubbles through the liquid to be treated. The known gas distributers, such as porous stones, perforated or porous stone-ware pipes or the like, may be used for this purpose. In this manner the reaction

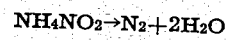

$$NH_4NO_2 \rightarrow N_2 + 2H_2O$$

is avoided as much as possible, whilst the reaction

$$2NH_4NO_2 + 2HNO_3 \rightarrow 2NH_4NO_3 + NO + NO_2 + H_2O$$

is promoted.

I claim as my invention:

1. Process for the absorption of nitrogen oxides from gases leaving the acid absorption system of a nitric acid plant comprising contacting said gases with a concurrently flowing stream of ammonia gas in excess while in the presence of oxygen and water vapor and subsequently forming a solution of the resulting ammonium salts in a solvent therefor, passing the resulting solution of ammonium nitrite and ammonium nitrate into the top of a tower simultaneously passing crude nitric acid into the top of said tower, forcing air into the bottom of said tower countercurrent to said introduced liquids, and withdrawing the resulting nitric acid-ammonium nitrate solution from the bottom of said tower.

2. Process for the absorption of nitrogen oxides from gases leaving the acid absorption system of a nitric acid plant comprising contacting the traces of nitrogen oxides with sufficient gaseous ammonia in excess to neutralize the oxides of nitrogen in said gas stream and render the resulting stream slightly alkaline, passing said resulting gas stream into contact with a solution of ammonium nitrate, whereby amounts of ammonium nitrate and ammonium nitrite solution are formed, passing said ammonium nitrite and ammonium nitrate solution together with amounts of crude nitric acid countercurrent to an air stream whereby a mixture of ammonium nitrate and nitric acid is produced.

3. Process for absorbing traces of nitrogen oxides from the gas stream leaving the acid absorption system of a nitric acid plant comprising continuously first contacting said traces of nitrogen oxides with a concurrently flowing stream of free ammonia in excess, while in the presence of water vapor and air and then removing as a solution the ammonium nitrite and ammonium nitrate formed.

4. In a process for the production of nitric acid by absorbing nitrogen oxides in dilute nitric acid, the steps of mixing the residual gas stream containing about .2% nitrogen oxides with a concurrently flowing stream of ammonia gas in excess while in the presence of water vapor and air and thereafter removing as a solution the ammonium nitrite and ammonium nitrate formed.

MAARTEN VOOGD.